G. R. LONG & C. A. AUSTIN.
UNIVERSAL JOINT.
APPLICATION FILED JUNE 28, 1909.
947,751.
Patented Jan. 25, 1910.
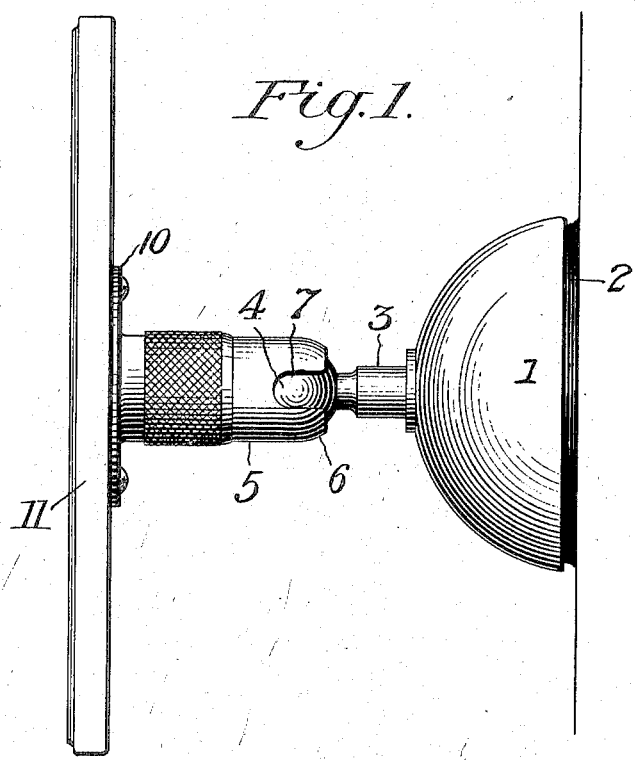
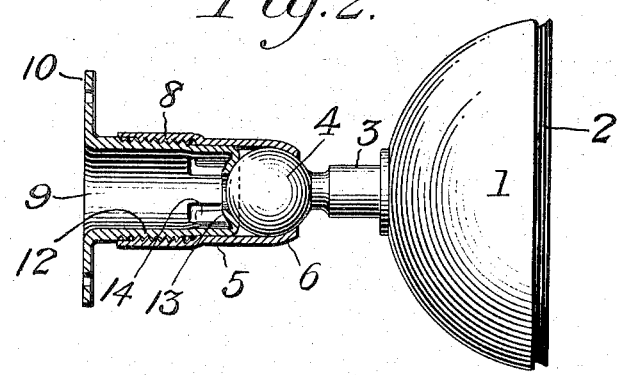
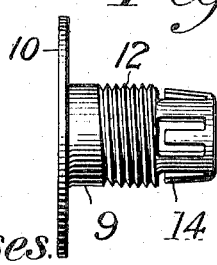
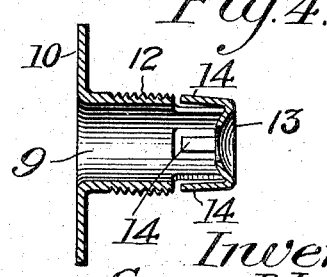
Witnesses.
Lillie M. Perry
Inventors.
George R. Long.
Charles A. Austin.
by Wm. H. Finckel Atty.

UNITED STATES PATENT OFFICE.

GEORGE R. LONG, OF WATERBURY, CONNECTICUT, AND CHARLES A. AUSTIN, OF NEW YORK, N. Y., ASSIGNORS TO SCOVILL MANUFACTURING COMPANY, OF WATERBURY, CONNECTICUT, A CORPORATION OF CONNECTICUT.

UNIVERSAL JOINT.

947,751. Specification of Letters Patent. Patented Jan. 25, 1910.

Application filed June 28, 1909. Serial No. 504,912.

*To all whom it may concern:*

Be it known that we, GEORGE R. LONG, of Waterbury, in the county of New Haven and State of Connecticut, and CHARLES A. AUSTIN, of New York, in the county of New York and State of New York, citizens of the United States, have invented a certain new and useful Improvement in Universal Joints, of which the following is a full, clear, and exact description.

The object of this invention is to provide a friction joint for brackets for use in supporting articles in such manner as to be movable in any direction to suit the user, and the special object of the invention is to provide an efficient joint for that kind of shaving mirror brackets which are provided with a suction-device by which the mirror may be supported on any plane surface, such as a window-pane or smooth wall.

The invention consists of a universal joint, for such brackets, composed essentially of a drawn shell or sleeve internally threaded and adapted to be screwed onto a cupped stem having projecting lips which are capable of producing frictional contact with the inside of the shell, a ball on a part of the bracket being received within the shell or sleeve and thereby held seated on the cupped stem in such way that the parts of the bracket may be moved universally into any desired position and held in such position by friction between the shell or sleeve and the stem, the ball member coöperating with notches in the shell or sleeve to effect, in place of a wrench, the relative movement and radius of movement of the parts, all as we will proceed now to particularly set forth and finally claim.

In the accompanying drawings, illustrating the invention, in the several figures of which like parts are similarly designated, Figure 1 is a side elevation showing the parts of the joint alined horizontally, and the invention embodied in a suction support for a shaving mirror. Fig. 2 is a sectional elevation, the novel features of the invention being shown in longitudinal section. Fig. 3 is a side elevation of the stem, and Fig. 4 is a longitudinal section thereof.

The suction device 1 may be of any approved construction, preferably formed of a metallic cup containing a suitable suction element 2, capable of being made to stick to a plane surface, such as a window-pane or smooth wall. This suction device 1 has a projection 3 terminating in a ball 4 forming the ball element of the universal joint.

5 is a drawn shell or sleeve open at both ends and having its outer end 6 closed in over the ball 4 and provided with the oppositely alined notches 7 adapted to receive the neck of the projection next to the ball 4, and thereby permitting a wide range of adjustment of the ball, and also serving to so connect the sleeve and its appurtenances hereinafter described and the projection 3 as to take the place of a wrench in effecting the movement of these parts with relation to one another when force is applied thereto, and thus admit of the assembling and disconnecting of the parts. The sleeve 5 is provided with an internal screwthread 8.

The stem 9 may have a base-flange 10 to receive a mirror 11 or other object to be supported. This stem 9 is preferably hollow and is screwthreaded at 12 to receive the screwthreaded shell or sleeve 5. The outer end of the stem 9 is cupped as at 13 to form a seat for the ball 4, said ball being grasped and partly circumferentially surrounded by the said cup 13 and the closed-in end 6 of the shell or sleeve 5. By turning the sleeve 5 on the stem 9 the ball may be engaged with more or less friction to hold the parts in adjusted position; and in order to fix this adjustment, the sides of the stem 9 are cut out so as to provide spring fingers 14 projecting laterally into frictional engagement with the inner walls of the sleeve 5.

The invention is not limited to the particular construction of friction device shown, but what is shown is a very simple and efficient illustration of the invention.

As hereinafter set forth in the claims, the principal feature of the invention is the provision in a universal joint of a ball-seat part of which is formed by the cupped end of a stem and the other part by the closed-in end of a sleeve which is adjustable on the stem and its adjustment thereon held by frictional engagement of this sleeve and stem; and the invention is applicable not only to portable mirrors but also to a great variety of articles where universal adjustment is desirable.

The invention is not limited to any particular means for holding the adjustment of the shell or sleeve.

What we claim is: —

1. A universal joint, comprising a ball member, a ball seat composed of a cupped stem to receive the ball, an adjustable shell or sleeve applied to the stem and having a closed-in end to hold the ball on its seat, and lateral notches adapted to be engaged by the ball member to effect relative movement of the ball member and its support and means to hold the parts in given position.

2. A universal joint, comprising a ball-seat composed of a cupped stem to receive the ball, and an adjustable shell or sleeve applied to the stem and having a closed-in end to hold the ball on its seat, and friction fingers on the stem interposed between the stem and sleeve to hold the parts in given adjustment.

3. A universal joint, composed of a ball member, a stem having a cupped end to form a seat for the ball and having adjacent thereto laterally projecting spring fingers, and a sleeve engaging the ball and holding it to its cupped seat on the stem, said sleeve in screwthreaded adjustable connection with the stem near one end and in frictional engagement with the spring fingers of said stem near the other end.

4. In a universal joint, a ball member, a ball-receiving member including a cupped stem, an adjustable sleeve applied to said stem and having lateral notches adapted to be engaged by the ball member to increase the radius of adjustment of the joint and also serving to lock together the sleeve and ball member to effect their relative movement, and a friction device interposed between the cupped stem and the adjustable sleeve to hold the parts in any given adjusted position.

In testimony whereof we have hereunto set our hands.

GEORGE R. LONG.
CHARLES A. AUSTIN.

Witnesses as to George R. Long:
  HENRY FEHL,
  L. H. BASSETT.

Witnesses as to Charles A. Austin:
  R. C. AUSTIN,
  W. D. HANBRIDGE.